US009045215B2

(12) United States Patent
Knowles et al.

(10) Patent No.: US 9,045,215 B2
(45) Date of Patent: Jun. 2, 2015

(54) WINDOW ASSEMBLY WITH A MOTORIZED WINDOW SHADE MECHANISM

(75) Inventors: Byron R. Knowles, Boynton Beach, FL (US); John Y. Kamin, Boynton Beach, FL (US)

(73) Assignee: Aerospace Technologies Group, Inc., Boynton Beach, FL (US)

(*) Notice: Subject to any disclaimer, the term of this patent is extended or adjusted under 35 U.S.C. 154(b) by 412 days.

(21) Appl. No.: 12/943,569

(22) Filed: Nov. 10, 2010

(65) Prior Publication Data

US 2011/0108208 A1 May 12, 2011

Related U.S. Application Data

(60) Provisional application No. 61/260,354, filed on Nov. 11, 2009.

(51) Int. Cl.
*A47H 5/00* (2006.01)
*B64C 1/14* (2006.01)
(Continued)

(52) U.S. Cl.
CPC .............. *B64C 1/1484* (2013.01); *B60J 1/2091* (2013.01); *B64C 21/025* (2013.01); *E06B 9/262* (2013.01);
(Continued)

(58) Field of Classification Search
CPC ................ E06B 2009/2625; E06B 2003/4492; E06B 9/327
USPC ............. 160/89, 90, 98, 26, 33, 84.02, 84.06, 160/310, 168.1 P, 172 R, 265, 267.1, 160/DIG. 17, 107
See application file for complete search history.

(56) References Cited

U.S. PATENT DOCUMENTS 2,184,098 A * 12/1939 Lemp et al. .................. 160/169

2,242,923 A * 5/1941 Pratt ........................ 160/172 R
(Continued)

FOREIGN PATENT DOCUMENTS

| CN | 2795427 | 7/2006 |
|---|---|---|
| CN | 101131065 | 2/2008 |
| CN | 101528491 | 9/2009 |

OTHER PUBLICATIONS

Office Action dated Oct. 25, 2012 issued in the corresponding Chinese Patent Application No. 201010542657.2.

*Primary Examiner* — Katherine Mitchell
*Assistant Examiner* — Johnnie A Shablack
(74) *Attorney, Agent, or Firm* — Cozen O'Connor

(57) ABSTRACT

A motorized mechanism for actuating motion within a housing of a window shade arrangement having first and second window shades for controlling the amount of light admitted through a window. The motorized mechanism comprises a first rail assembly movable in the housing and connected to a first end of the first window shade and a first end of the second window shade, a second rail assembly movable in the housing and connected to a second end of the second window shade, a second end of the first window shade being fixed to the housing, said first and second window shades being adapted to be extended and compressed relative to the window in accordance with motion within the housing of at least one of said first and second rail assemblies. A first cable is looped between a motor-driven first pulley and a second pulley along a first path. A second cable is looped between a motor-driven third pulley and a fourth pulley along a second path. Corresponding ends at one side of said first and second rail assemblies are in said first path, with only one of said first and second rail assemblies being connected to the first cable, and corresponding ends at the other side of said first and second rail assemblies being in said second path, with only the other one of said first and second rail assemblies being connected to the second cable.

14 Claims, 12 Drawing Sheets

(51) Int. Cl.
  *B60J 1/20* (2006.01)
  *B64C 21/02* (2006.01)
  *E06B 9/262* (2006.01)
  *E06B 9/302* (2006.01)
  *E06B 9/322* (2006.01)
  *E06B 9/327* (2006.01)
  *E06B 9/58* (2006.01)

(52) U.S. Cl.
  CPC ............... *E06B 9/302* (2013.01); *E06B 9/322* (2013.01); *E06B 9/327* (2013.01); *E06B 2009/2627* (2013.01); *E06B 2009/587* (2013.01); *Y02T 50/166* (2013.01); *B64C 2230/02* (2013.01)

(56) References Cited

U.S. PATENT DOCUMENTS

| | | | |
|---|---|---|---|
| 2,268,858 A * | 1/1942 | Dodge | 160/172 R |
| 4,679,610 A * | 7/1987 | Spraggins | 160/107 |
| 4,733,710 A * | 3/1988 | Haines | 160/84.06 |
| 4,807,686 A | 2/1989 | Schnebly et al. | |
| 4,852,627 A * | 8/1989 | Peterson et al. | 160/84.02 |
| 4,917,167 A * | 4/1990 | Voss et al. | 160/84.02 |
| 4,945,969 A * | 8/1990 | Schnebly et al. | 160/84.02 |
| 4,998,576 A * | 3/1991 | Moreno | 160/90 |
| 5,082,043 A * | 1/1992 | Moreno | 160/90 |
| 5,083,598 A * | 1/1992 | Schon | 160/84.02 |
| 5,141,041 A * | 8/1992 | Katz et al. | 160/84.02 |
| 5,170,108 A * | 12/1992 | Peterson et al. | 318/469 |
| 5,179,989 A * | 1/1993 | Schon | 160/84.02 |
| 5,195,569 A * | 3/1993 | Peterson et al. | 160/84.06 |
| 5,515,898 A * | 5/1996 | Alcocer | 160/84.02 |
| 5,676,189 A * | 10/1997 | Zeeb | 160/331 |
| 6,186,211 B1 * | 2/2001 | Knowles | 160/84.02 |
| 6,230,784 B1 * | 5/2001 | Sanz et al. | 160/84.02 |
| 6,338,377 B1 * | 1/2002 | Domel | 160/84.02 |
| 6,460,805 B1 * | 10/2002 | Sanz et al. | 244/129.3 |
| 6,481,486 B1 * | 11/2002 | Sanz et al. | 160/84.06 |
| 6,516,856 B2 * | 2/2003 | Lai | 160/89 |
| 6,745,810 B1 * | 6/2004 | Moreno et al. | 160/97 |
| 6,758,255 B2 * | 7/2004 | Sanz et al. | 160/84.06 |
| 6,832,641 B1 * | 12/2004 | Sanz et al. | 160/90 |
| 6,915,988 B2 * | 7/2005 | Sanz et al. | 244/129.3 |
| 7,240,582 B1 * | 7/2007 | Manaras et al. | 74/567 |
| 7,690,414 B2 * | 4/2010 | Knowles | 160/90 |
| 8,157,214 B2 * | 4/2012 | Schwarz et al. | 244/129.3 |
| 8,220,521 B2 * | 7/2012 | Tischer et al. | 160/310 |
| 2001/0011580 A1 * | 8/2001 | Knowles | 160/84.02 |
| 2003/0085001 A1 * | 5/2003 | Sanz et al. | 160/84.04 |
| 2004/0256061 A1 * | 12/2004 | Krosenbrink et al. | 160/84.03 |
| 2005/0006035 A1 * | 1/2005 | Lai | 160/89 |
| 2005/0263254 A1 * | 12/2005 | Sievers et al. | 160/90 |
| 2008/0148638 A1 * | 6/2008 | Knowles | 49/70 |
| 2008/0190568 A1 * | 8/2008 | Schwarz et al. | 160/84.06 |
| 2009/0241424 A1 | 10/2009 | Mohat et al. | |
| 2009/0283227 A1 * | 11/2009 | Mohat et al. | 160/369 |
| 2009/0314439 A1 * | 12/2009 | Waters | 160/84.02 |
| 2012/0061031 A1 * | 3/2012 | Zhang | 160/107 |
| 2012/0067528 A1 * | 3/2012 | Mohat | 160/84.02 |

\* cited by examiner

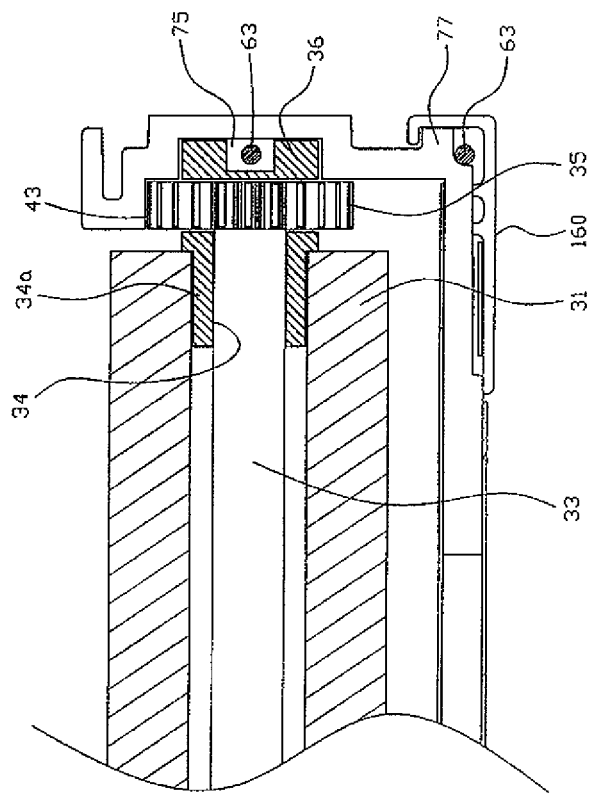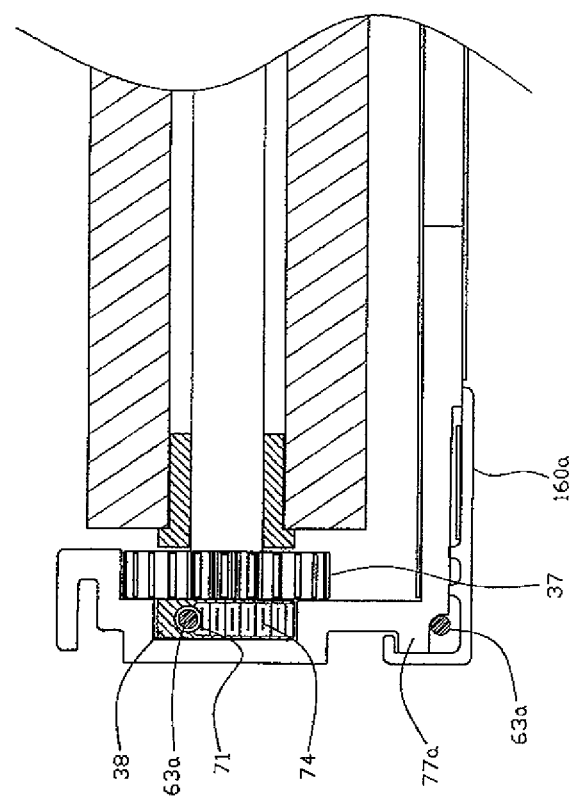
FIG. 3

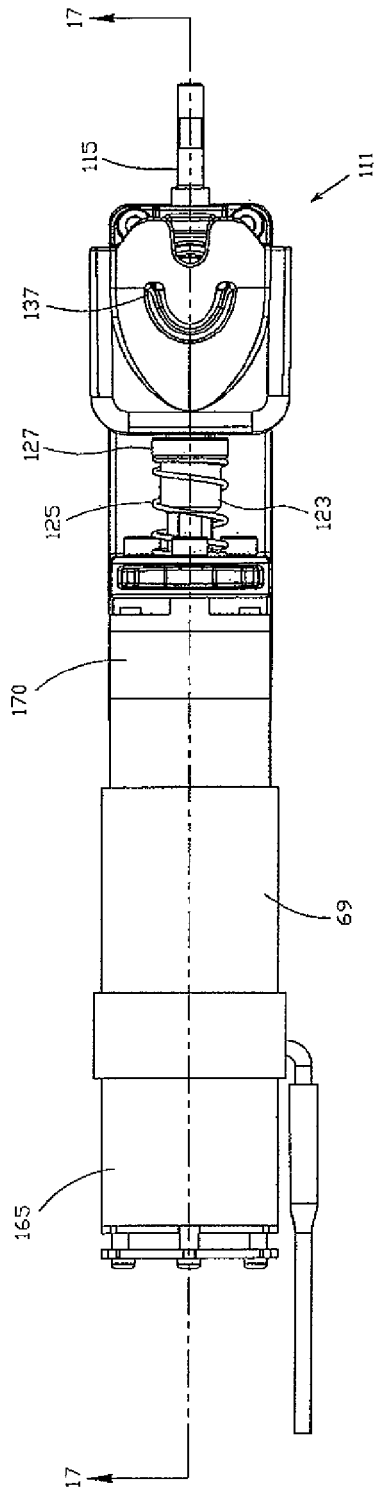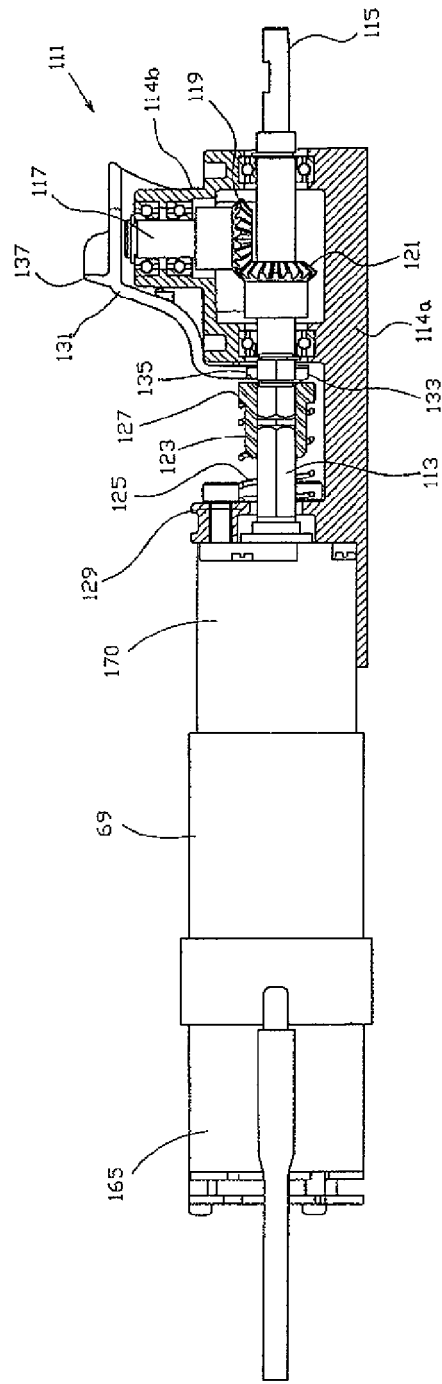

WINDOW ASSEMBLY WITH A MOTORIZED WINDOW SHADE MECHANISM

RELATED APPLICATIONS

This application claims priority from U.S. Provisional Patent Application Ser. No. 61/260,354 which was filed on Nov. 11, 2009, the entire content of which is hereby incorporated by reference.

FIELD OF THE INVENTION

The present invention is directed to a motorized window shade assembly adapted in particular for use in windows of airplanes, that is readily assembled and installed, and which provides convenient and reliable operation.

BACKGROUND OF THE INVENTION

The motorized window shade mechanism disclosed in U.S. Pat. No. 6,186,211 was a major improvement over other mechanisms of this type known at that time. For example, it was highly effective in reducing the number of components required, increasing reliability, and meeting the rigid requirements associated with use aboard aircraft.

Despite its many advantages, some room exists for attaining further improvements in this product. For example, the aircraft window has a porthole through which light enters the cabin. In addition to the window shade being movable up and down by a drive assembly to control the amount of light being blocked, its width is sized to be wider than that of the porthole by a certain lateral spacing so that the side edge of the window shade extends laterally past the porthole in order to block incoming light. If the lateral extension of the window shade beyond the porthole is small, some light will bleed around the side of the window shade. Thus, it is desirable to make the window shade as wide as possible relative to the porthole. However, since the width of the shell (Wshell) for the window assembly is a given dimension for each aircraft, the width of the window shade (Wshade) is limited by the width of the vertical drive channel (Wdc) through which the drive assembly moves (Wshade=Wshell−2Wdc). The wider is this drive channel, the narrower must be the window shade. Thus, one area for potential improvement is to make this drive channel of motorized window shade mechanism as disclosed in U.S. Pat. No. 6,186,211 narrower.

One embodiment disclosed in U.S. Pat. No. 6,186,211 has two window shades that can be selectively moved into position to block light. One window shade can be translucent while the other is opaque. Each shade has its own motorized drive mechanism. Both motorized drive mechanisms must fit within the small confines of an aircraft window. To accomplish this, the motorized window shade mechanisms as disclosed in U.S. Pat. No. 6,186,211 had the motors inserted in the rail attached to the bottom edge of the shade. Since the motors moved along with the rail as the shade was extended and compressed, a flexible conductive ribbon functioning as a power cable and moving with the motors was required to energize the motors. This cable required its own space in the drive channel within which to travel with the motors. It is desirable to eliminate the need for this cable and for the space it requires. In fact, this is one way for making the drive channel narrower. Also, installing the motors in the rail imposes severe size limitations on the motor, which makes it more difficult to find a suitable motor in terms of size, performance and price. Such an arrangement also makes the rail large, thereby increasing the stack height of the shade assembly, which is undesirable.

Furthermore, motorized window shades can experience motion even though they should be stationary while the drive motor is inactive, i.e. uncommanded motion. Such uncommanded motion can occur due to such factors as the weight of the shade and/or the compression pressure of the shade while the motor is deactivated. It is desirable to eliminate such uncommanded motion.

SUMMARY OF THE INVENTION

One object of the present invention is to provide an improved motorized window shade assembly.

Another object of the present invention is to eliminate bleeding of light around the side edge of the window shade.

A further object of the present invention is to simplify the use of motors in a motorized window shade assembly.

Yet another object of the present invention is to eliminate the occurrence of uncommanded motion.

These and other objects are attained in accordance with one aspect of the present invention directed to a motorized mechanism for operating a window shade for controlling the amount of light admitted through a window. The motorized mechanism includes a window shade adapted to be extended and compressed relative to the window in accordance with motion within a housing of a rail assembly attached to one end of said window shade. A motor is secured to the housing and coupled to a motor-driven first pulley. A cable is looped between said motor-driven first pulley and a second pulley, said second pulley being secured to the housing remotely from said first pulley. A component is coupled to one end of said rail assembly and to said cable to be movable within the housing between the first and second pulleys with motion of the cable in response to motor driven rotation of said first pulley to extend or compress the window shade.

Another aspect of the present invention is directed to a motorized mechanism for actuating motion within a housing of a window shade arrangement for controlling the amount of light admitted through a window. The motorized mechanism comprises a first window shade and a second window shade, said first window shade having a first end secured to the housing and a second end secured to a first rail assembly movable in the housing, said second window shade having a first end secured to said first rail assembly and a second end secured to a second rail assembly movable in the housing, said first and second window shades being adapted to be extended and compressed relative to the window in accordance with motion within the housing of at least one of said first and second rail assemblies. A first motor is secured to the housing and coupled to a motor-driven first pulley. A first cable is looped between said first pulley and a second pulley, said second pulley being secured to the housing remotely from said first pulley. A second motor is secured to the housing and coupled to a motor-driven third pulley. A second cable is looped between said motor-driven third pulley and a fourth pulley, said fourth pulley being secured to the housing remotely from said third pulley. A first component is coupled to one end of said first rail assembly and a second component coupled to the other end of said first rail assembly. A third component is coupled to one end of said second rail assembly and a fourth component coupled to the other end of said second rail assembly. The first cable is coupled to said third component to be movable within the housing between said first and second pulleys with motion of said first cable in response to motor driven rotation of said first pulley to extend or compress the second window shade, and said second cable is coupled to said second component to be movable within the housing between said third and fourth pulleys with motion of said second cable in response to motor driven rotation of said third pulley to extend or compress the first window shade.

Another aspect of the present invention is directed to a motorized mechanism for actuating motion within a housing of a window shade arrangement having first and second window shades for controlling the amount of light admitted through a window. The motorized mechanism comprises a first rail assembly movable in the housing and connected to a first end of the first window shade and a first end of the second window shade, a second rail assembly movable in the housing and connected to a second end of the second window shade, a second end of the first window shade being fixed to the housing, said first and second window shades being adapted to be extended and compressed relative to the window in accordance with motion within the housing of at least one of said first and second rail assemblies. A first cable is looped between a motor-driven first pulley and a second pulley along a first path. A second cable is looped between a motor-driven third pulley and a fourth pulley along a second path. Corresponding ends at one side of said first and second rail assemblies are in said first path, with only one of said first and second rail assemblies being connected to the first cable, and corresponding ends at the other side of said first and second rail assemblies being in said second path, with only the other one of said first and second rail assemblies being connected to the second cable.

BRIEF DESCRIPTION OF THE DRAWINGS

FIG. 3 is an enlargement of the ends of the cross section shown in FIG. 2.

FIG. 16 is a plan view of the motor and manual override assembly.

FIG. 17 is a cross section taken along line 17-17 of FIG. 16.

BRIEF DESCRIPTION OF THE DRAWINGS

Figure 1:
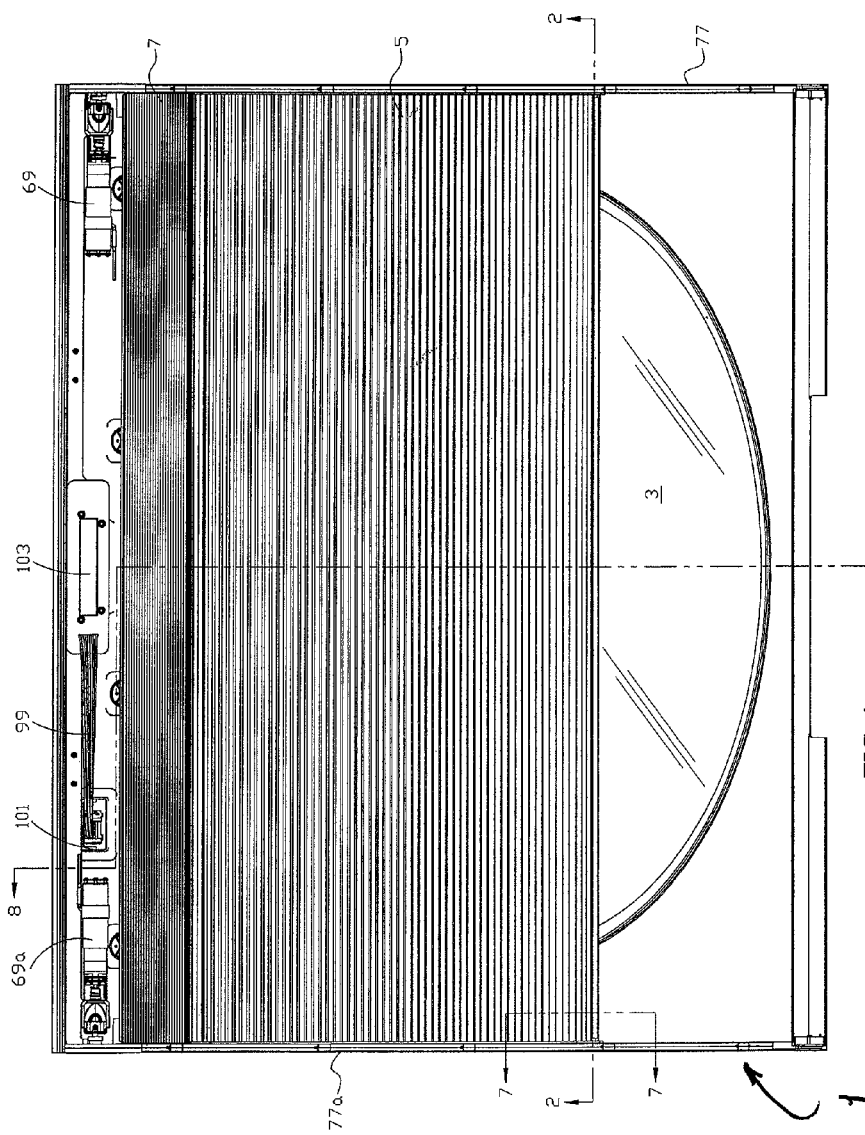
FIG. 1 is an elevational view of a window assembly which includes a motorized window shade mechanism in accordance with an embodiment of the invention.
Figure 2:
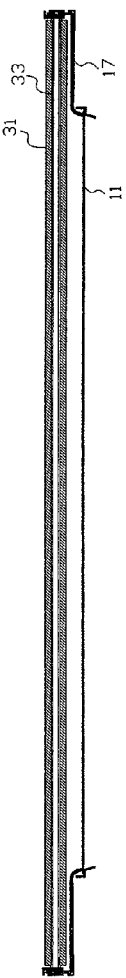
FIG. 2 is a cross section taken along line 2-2 of the window assembly of FIG. 1.

As shown in FIG. 1, window assembly 1 ("window" hereinafter) has a porthole 3 and window shades 5 and 7 which are positioned so that they can be deployed to block passage of at least some light through porthole 3. Each of window shades 5 and 7 is made of any known type of pleated material conventionally used for shades which can be compressed relatively tightly, to a height of less than one-half inch, for example, so that it occupies a minimal amount of space at the top of the window in order to provide an unimpeded view and to allow light to pass completely unobstructed through porthole 3. Shade 5 is made of a translucent material that lets some light through. Shade 7 is made of an opaque material that lets little or no light through. Each shade can be extended to any desired position. From the fully compressed position of both shades at the top of the window, shade 5 is first movable to any desired position, such as the partially extended position shown in FIG. 1. Shade 7 remains fully compressed as shade 5 is extended. When shade 5 is fully extended, shade 7 can be moved to any desired position. In this way, the passenger has practically an infinite choice of how much light to admit through the window.

Figure 4:
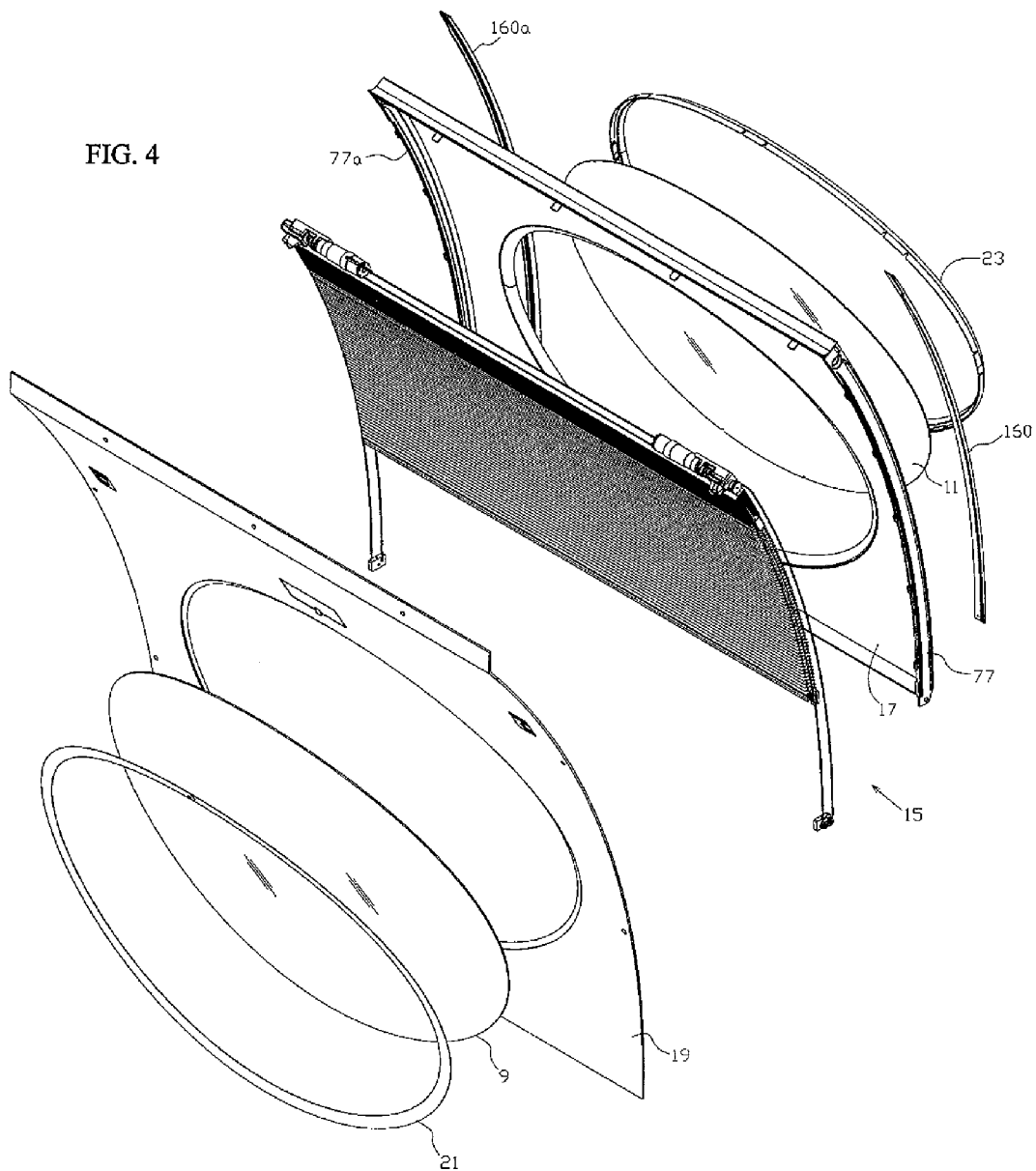
FIG. 4 is an exploded view of an aircraft window into which has been incorporated the embodiment of the invention as shown in FIG. 1.
Figure 9:
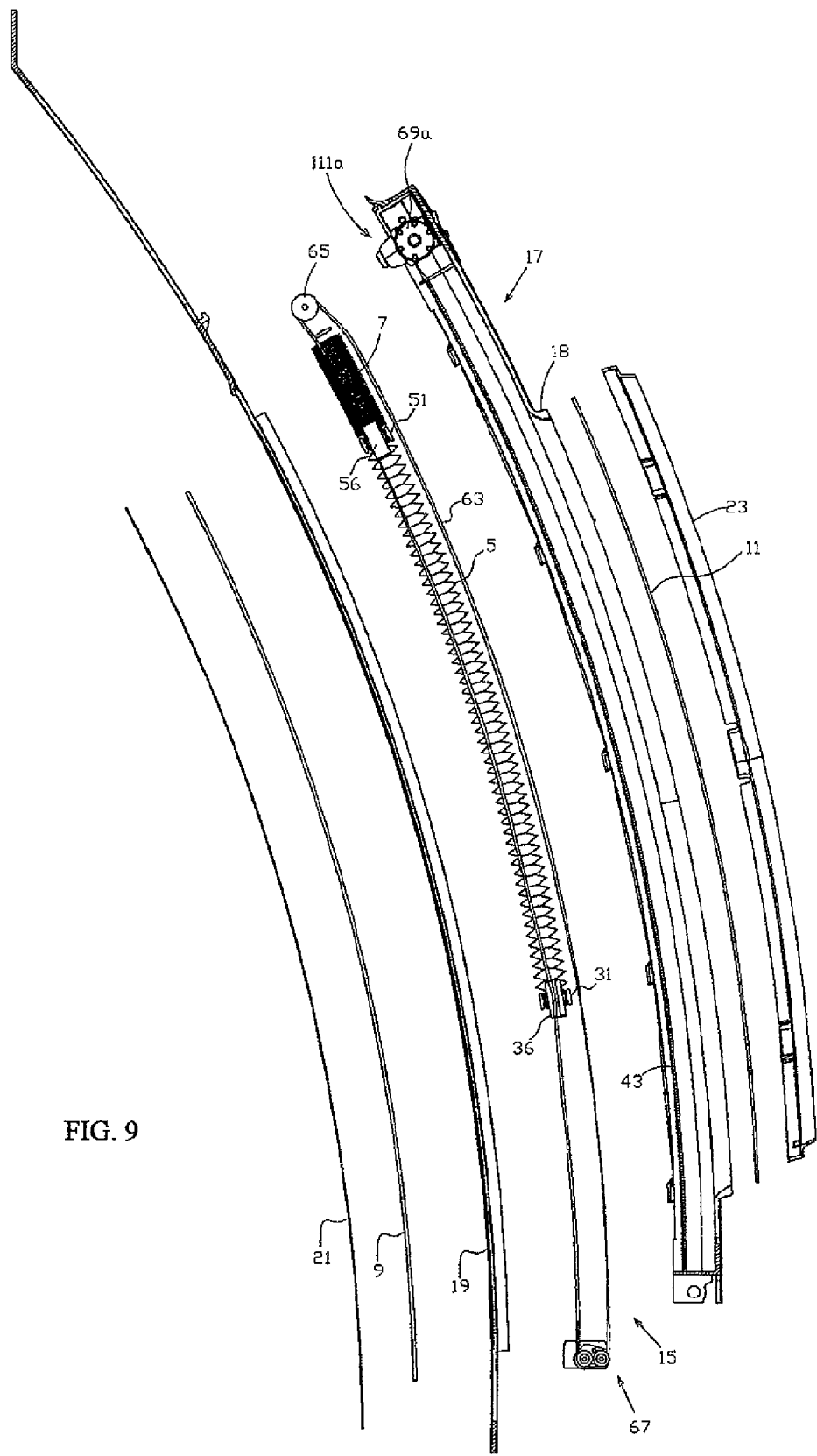
FIG. 9 is an exploded view corresponding to the window assembly as shown in FIG. 8, except that motorized drive mechanism 15 is not shown in section but rather in a side view.

Although window 1 can be any type of window set in any environment, the present invention is disclosed with particular applicability to an aircraft window. As shown in FIGS. 4 and 9, an aircraft window is typically contoured to fit the curvature of the particular aircraft body into which it will be installed. Window 1 has an inner pane 9 and an outer pane 11. A motorized drive mechanism 15 (see FIGS. 4, 5 and 9) is provided for operating window shades 5 and 7. Mechanism 15 is placed in shell 17 and is kept in place by a panel 19 which is attached to the shell. Inner pane 9 is secured by retainer 21 which is snap-fit into a slot (not shown) in panel 19. Outer pane 11 is secured by retainer 23 which is snap-fit onto a flange of shell 17. Thus, shades 5 and 7 are positioned within the interior space of the window between panes 9 and 11.

Figure 10:
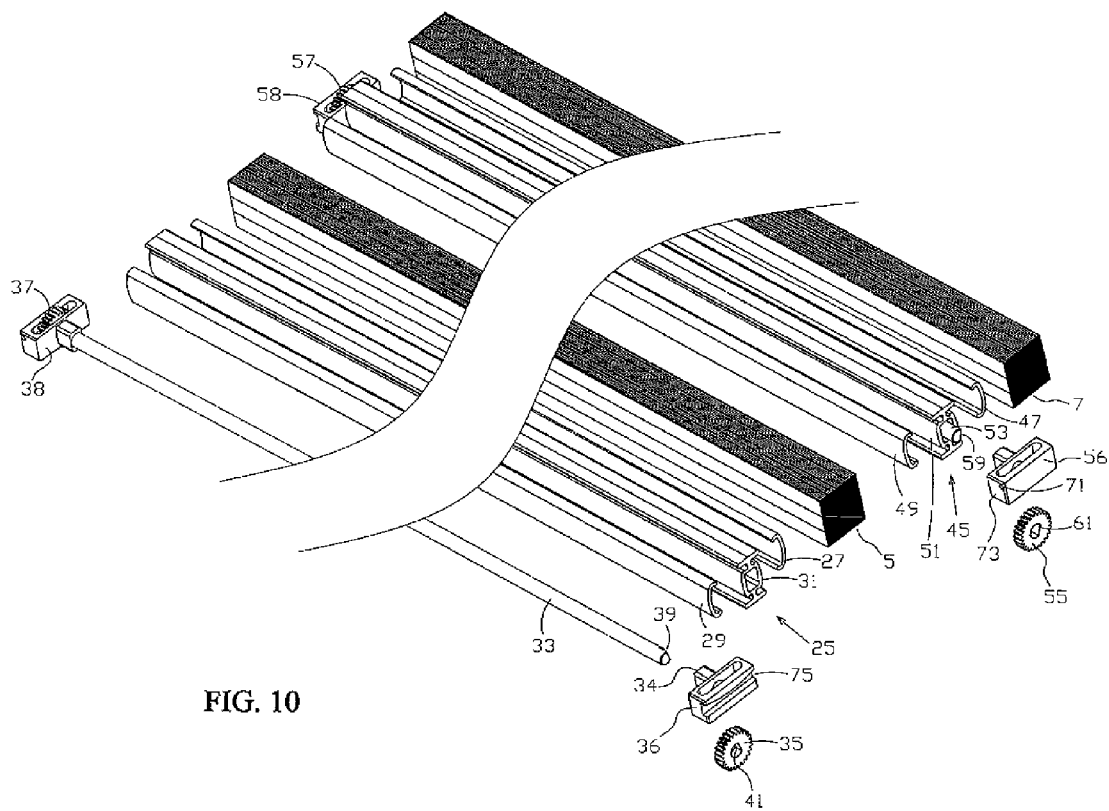
FIG. 10 is an exploded view of the two window shades and certain components of the drive mechanism.

Shades 5 and 7 and some associated drive mechanism components are shown in FIG. 10. The shades are shown in their fully compressed form. At the bottom of shade 5 is a rail 25 which is comprised of a top cap 27, a bottom cap 29, and a channel 31. Caps 27 and 29 are configured so that they can be snap-fit onto channel 31 to secure them in place. Cap 27 is slipped through the bottom pleat of shade 5, and then it is snap-fit onto channel 31. This way the pleat is attached to rail 25. Thus, as rail 25 is moved, its movement produces extension or compression of shade 5. Cap 29 is decorative and is used to finish off the appearance of the window shade rail aesthetically.

An axle, or shaft, 33 is configured to be inserted into the through-hole in channel 31. As best shown in FIG. 3, the ends of axle 33 protrude from channel 31 so that they can carry gears 35 and 37. Gear 35, while positioned inside carrier 36, slides onto the end of axle 33 that has flat 39 on it. As the end of axle 33 passes through opening 34 in boss 34a (see FIGS. 3, 5, 7 and 10) of carrier 36 to reach gear 35, carrier 36 is simultaneously mounted onto axle 33 along with gear 35. Gear 35 has a corresponding flat 41 so that it is locked to rotate together with the axle. Similarly, gear 37, while positioned inside carrier 38, is lockably mounted onto the other end of axle 33 so as to be rotatable therewith. For reasons that will become apparent below, gear 37 is a driven gear, and gear 35 is a passive gear. As gear 37 is driven, its movement will cooperate with rack 43 in shell 17 (described in detail below with respect to FIGS. 6 and 7) to move rail 25 up and down to compress and expand shade 5. Since passive gear 35 is coupled to driven gear 37 by axle 33, the two gears will turn together to produce smooth motion of rail 25 along the window without any twisting of the rail or binding of the gears on the rack that might otherwise occur.

A similar arrangement is provided for shade 7. In particular, rail 45 is comprised of a top cap 47, a bottom cap 49, and channel 51. Caps 47 and 49 are configured so that they can be snap-fit onto channel 51 to secure them in place. Cap 47 is slipped through the bottom pleat of shade 7, and then it is snap-fit onto housing 51. This way the pleat is attached to rail 45. Thus, as rail 45 is moved, its movement produces extension or compression of shade 7. Cap 49 is slipped through the top pleat of shade 5, and then it is snap-fit onto channel 51. Thus, shade 5 is suspended between rails 25 and 45.

Axle 53 is configured to be inserted into the through-hole in channel 51. The ends of axle 53 protrude from channel 51 so that they can carry gears 55 and 57. Gear 55, while positioned inside carrier 56, slides onto the end of axle 53 that has flat 59 on it. Gear 55 has a corresponding flat 61 so that both are locked to rotate together. Similarly, gear 57, while positioned inside carrier 58, is lockably mounted onto the other end of axle 53 so as to be rotatable therewith. For reasons that will become apparent below, gear 55 is a driven gear, and gear 57 is a passive gear. As gear 55 is driven, its movement will cooperate with rack 43 in shell 17 to move rail 45 up and down to compress and expand shades 5 and 7. Since passive gear 57 is coupled to driven gear 55 by axle 53, the two gears will turn together to produce the same smooth motion of rail 45 achieved for rail 25.

FIG. 3 clearly shows cable 63 accommodated within channel 75 of carrier 36. Cable 63 continues down from carrier 36 to tensioning assembly 67 (see FIG. 5) and then loops back up on the other side of retainer 77 to pulley 65. Retainer 77 is at the sides of shell 17 (see FIG. 4), as described in further detail below. The juxtaposition of cable 63 and retainer 77 is best seen in FIG. 3 which shows cable 63 sitting in the recess formed by retainer 77 and cap 160 (see FIG. 4). Of course, a similar arrangement is shown on the other side of the shade for cable 63a, retainer 77a and cap 160a.

Axles 33 and 53 are made of pultruded carbon fiber. Caps 27, 29, 47 and 49 are made of plastic, and they can all be identical to each other.

Figure 5:
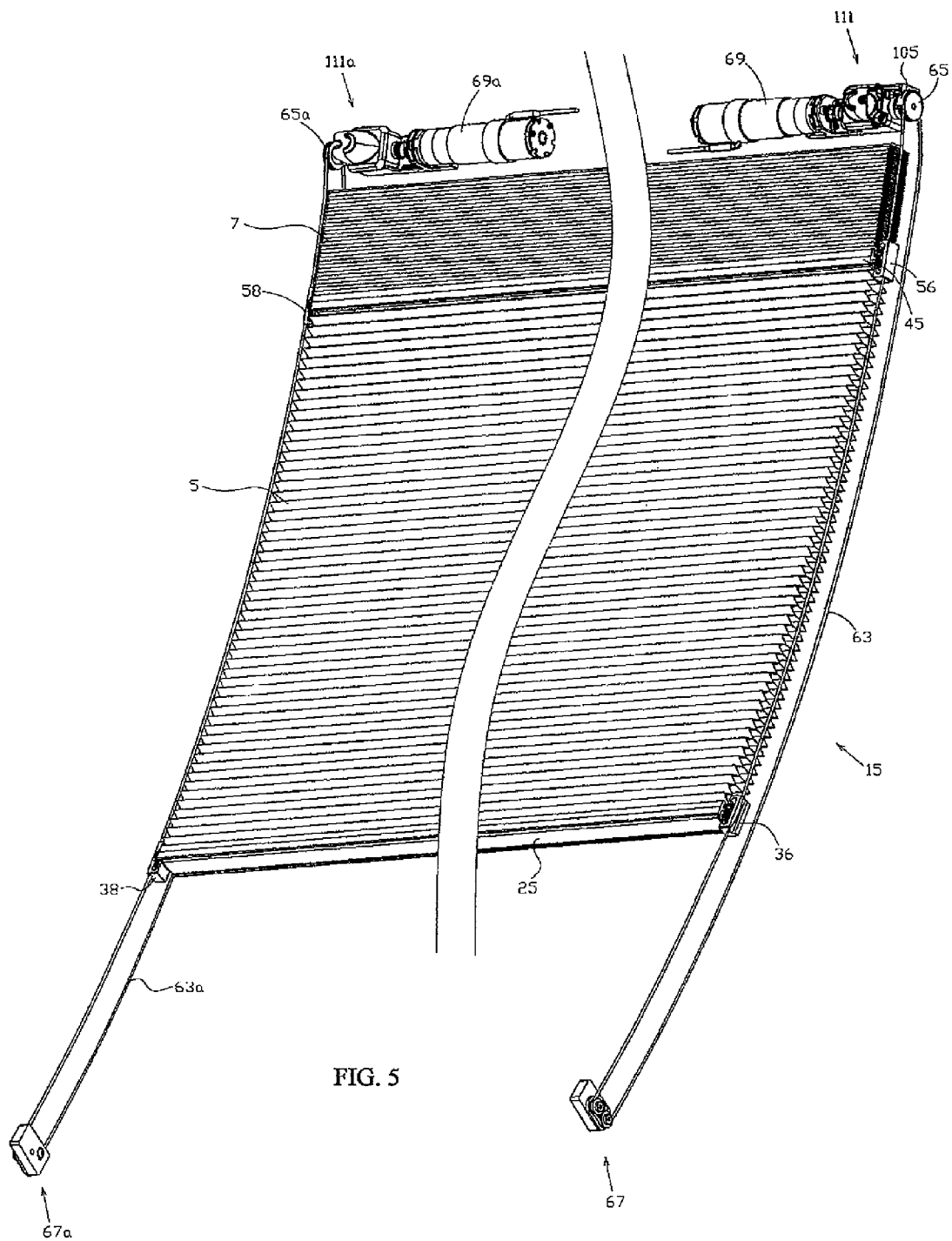
FIG. 5 is a perspective view of the motorized drive mechanisms for two window shades of the embodiment shown in FIG. 1.

Turning now to FIG. 5, it shows motorized drive mechanism 15 along with shades 5 and 7. Rail 25 is shown along with carriers 36 and 38 mounted to the ends of axle 33 housed within rail 25. Similarly, rail 45 is shown with carriers 56 and 58 mounted to the ends of axle 53 housed within rail 45. Passing through carriers 36 and 58 is a loop of a Synchromesh cable 63 that cooperates with motor driven pulley 65 as part of a Synchromesh Cable Drive. Such a drive is available from Stock Drive Products. Synchromesh cable 63 has a straight center section made of a core bundle of braided stainless steel wires encased in a nylon jacket. Wound spirally around the nylon jacket is another section made of a core bundle of braided stainless steel wires encased in a polyurethane jacket. When the Synchromesh cable is placed on the pulley 65, the spirally wound cable section fits within and engages specially sized and configured helical grooves in the pulley, so that rotation of the pulley produces linear motion of the cable.

Cable 63 is stretched between the motor driven pulley 65 and cable tensioning assembly 67 (discussed in detail below with respect to FIGS. 11 and 12). A cable guard 105 (described below in detail in connection with FIGS. 13-15) is mounted adjoining cable 63 and pulley 65. Motor 69 turns pulley 65. Since cable 63 is meshed with the grooves in pulley 65, rotation of pulley 65 produces corresponding linear motion of cable 63.

Carrier 56 is a driven carrier because it is fixed to and driven by cable 63. As shown in FIG. 10, carrier 56 has a hole 71 in its end wall 73. (A good view of hole 71 is shown in FIG. 3 with respect to driven carrier 38). This hole 71 goes completely through carrier 38 to a similar opening (not shown) in the opposite end wall. Cable 63 is inserted through one of these openings and exits through the other one to pass completely through carrier 38. Cable 63 is affixed to carrier 56 by a set screw (not shown) inserted into tapped hole 74 (see carrier 38 in FIG. 3). Cable 63 then continues to carrier 36 which is a passive carrier because it is not affixed to cable 63. Instead, carrier 36 has an elongated channel 75 passing completely therethrough from one end to the other. Cable 63 runs freely through channel 75. Channel 75 can be curved, as is visible in FIG. 10, for example, to match the arc followed by cable 63.

In operation, motor 69 is used to extend and compress shade 7. As motor 69 is controlled to turn in a particular direction, depending on whether extension or compression of shade 7 is desired, and for a specific number of turns, depending on how much movement of shade 7 is desired, it drives pulley 65. In turn, rotation of pulley 65 generates linear motion of cable 63. Since carrier 56 is attached to cable 63, they both move together. As carrier 56 moves, and because its associated gear 55 is in mesh with rack 43, the gear 55 will turn along with axle 53. Rotation of axle 53 will cause rotation of gear 57 at the opposite end of the axle. Since gear 57 is in mesh with rack 43, both ends of rail 45 will move synchronously and smoothly to position the shade as desired. Thus, due to the cable 63 being fixed to driven carrier 56 but not to passive carrier 36, motor 69 drives only shade 7 and not shade 5.

Similarly, at the other side of the window shade assembly, cable 63a is stretched between the motor driven pulley 65a and cable tensioning assembly. Motor 69a turns pulley 65a. Since cable 63a is meshed with the grooves in pulley 65a, rotation of pulley 65a produces corresponding linear motion of cable 63a. Cable 63a is affixed to driven carrier 38. Cable 63a then continues to passive carrier 58 which has the same structure as passive carrier 36. Passive carrier 58 is not affixed to cable 63a. Cable 63a runs freely through carrier 58.

In operation, motor 69a is used to extend and compress shade 5. As motor 69a is controlled to turn in a particular direction, depending on whether extension or compression of shade 5 is desired, and for a specific number of turns, depending on how much movement of shade 5 is desired, it drives pulley 65a. In turn, rotation of pulley 65a generates linear motion of cable 63a. Since carrier 38 is attached to cable 63a, they both move together. As carrier 38 moves, and because its associated gear 37 is in mesh with rack 43, the gear 37 will turn along with axle 33. Rotation of axle 33 will cause rotation of gear 35 at the opposite end of the axle. Since gear 35 is in mesh with rack 43, both ends of rail 25 will move synchronously and smoothly to position the shade as desired. Thus, due to the cable 63a being fixed to driven carrier 38 but not to passive carrier 58, motor 69a drives only shade 5 and not shade 7.

Motors 69 and 69a receive power from a power source (not shown) in the aircraft transitioning into the window assembly through connector 101 mounted in shell 17. Wires 99 transition from connector body 101 to electronic control circuit 103 in the form of a printed circuit board mounted on shell 17.

Figure 6:
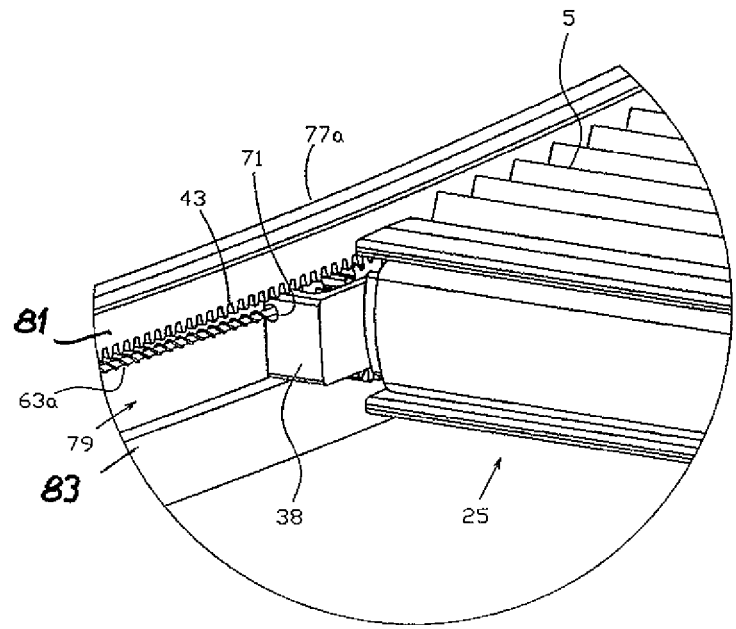
FIG. 6 is an enlarged, perspective view of the rail and drive mechanism in the vicinity of the cross-section shown in FIG. 7.
Figure 7:
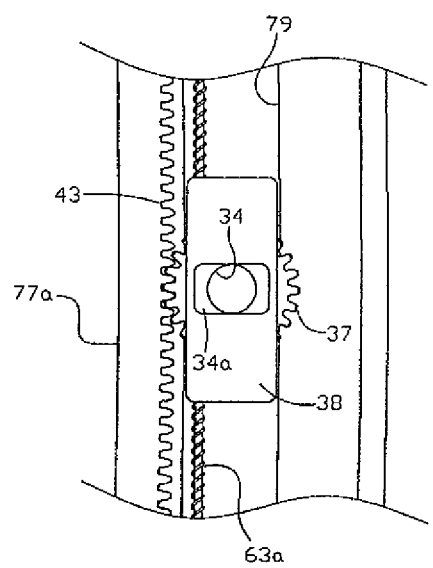
FIG. 7 is a cross section taken along line 7-7 of the embodiment shown in FIG. 1.
Figure 8:
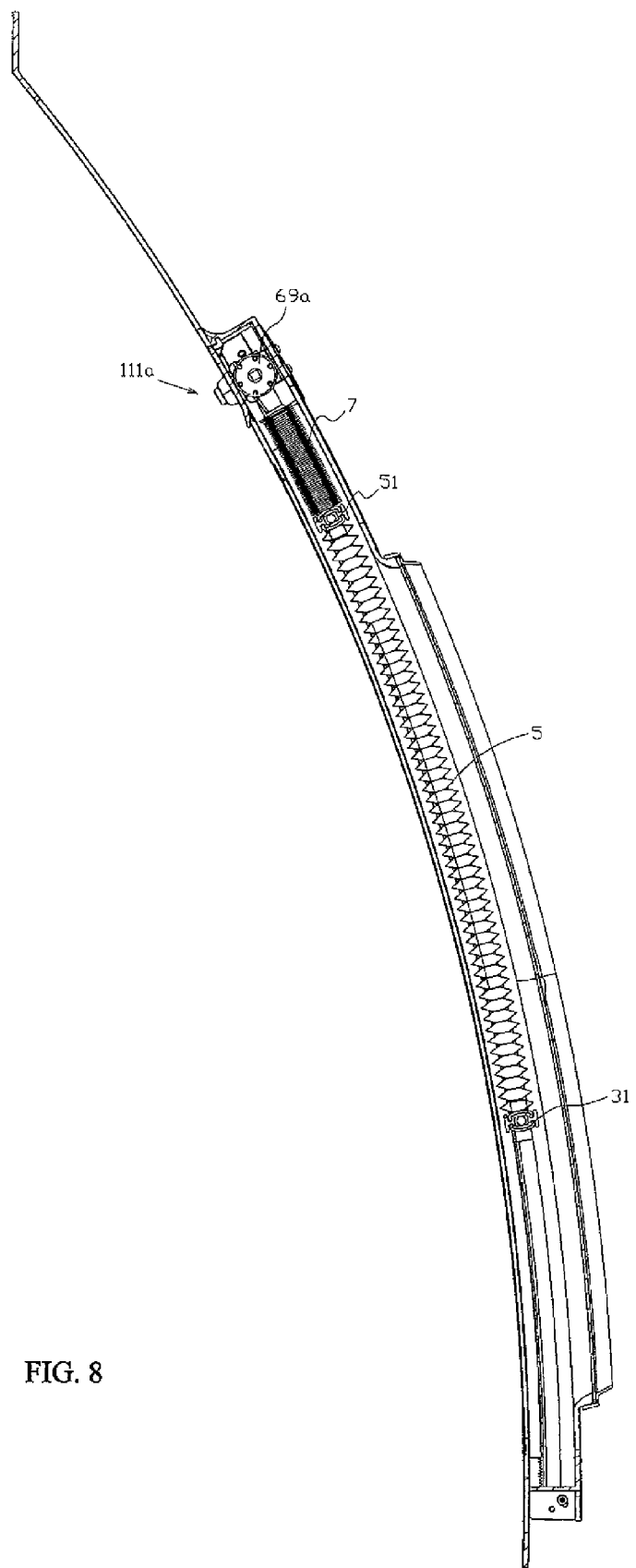
FIG. 8 is a cross section taken along line 8-8 of the window assembly of FIG. 1.

The motorized drive mechanism 15 is secured within window assembly 1 by retainers 77 and 77a (which are mirror images of each other) at the side edges of shell 17, as shown in FIG. 4. FIGS. 6 and 7 illustrate the retainers in greater detail. Retainer 77a has a slot 79 notched into its side. Slot 79 is defined by front wall 81 and rear wall 83. Rack 43 is embedded into the front wall 81 to face slot 79. Carrier 38 rides within slot 79 and gear 37 meshes with rack 43. Cable 63a is also visible in these drawings, as is boss 34a with its opening 34 to receive axle 33.

Figure 11:
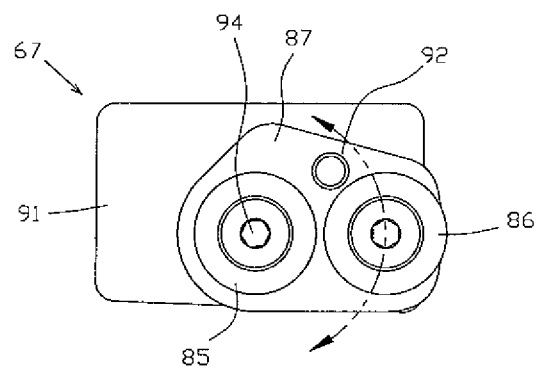
FIG. 11 is a front view of a cable tensioning assembly.
Figure 12:
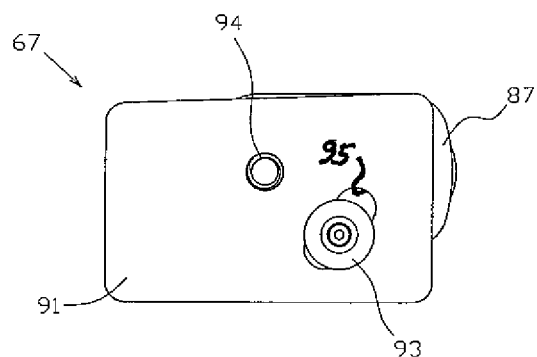
FIG. 12 is a back view of the cable tensioning assembly shown in FIG. 11

FIGS. 11 and 12 show that cable tensioning assembly 67 includes pulleys 85 and 86 rotatably mounted on plate 87 which is pivotably mounted on pillow block 91. The pivot point 94 permits rotation of plate 87 relative to pillow block 91. A set point adjusting screw 93 is inserted into a threaded opening 92 in plate 87. Screw 93 can slide within slot 95 in block 91 if it is not tightened. Its position within the slot can be fixed by tightening the screw. In operation, cable 63 is looped around pulleys 65, 85 and 86. As plate 87 is pivoted around pivot point 94, the tension on cable 63 can be adjusted. When the desired tension is reached, screw 93 is tightened to keep plate 89 in that position.

Figure 13:
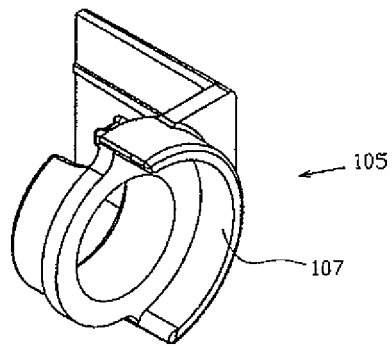
FIG. 13 is a perspective view of a cable guard.
Figure 14:
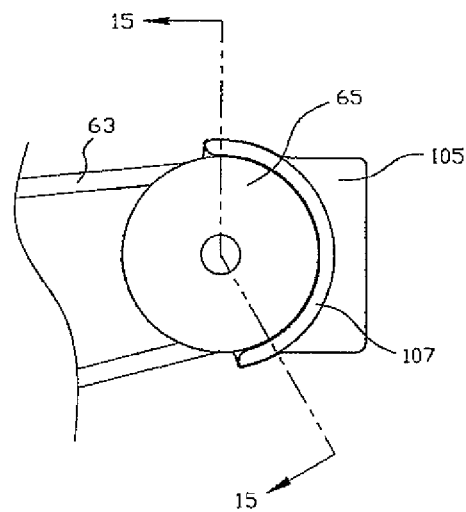
FIG. 14 is a side view of the cable guard shown in FIG. 13.
Figure 15:
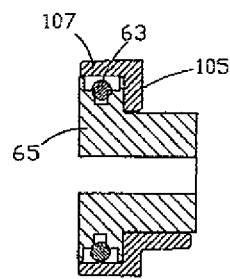
FIG. 15 is a cross section taken along line 15-15 of FIG. 14.

FIGS. 13-15 show details of cable guard 105. It has a curved surface 107 that is concentric with the pulley 65. Pulley 65 sits within the curvature of surface 107. The slight clearance between them is sized so that, as is apparent from FIGS. 14 and 15, cable 63 is trapped between pulley 65 and surface 107. This prevents cable 63 from jumping off pulley 65 as the motor 69 applies various forces to the cable. There are left and right versions of cable guard 105 which are mirror images of each other.

Window assembly 1 also includes a manual override assembly 111 shown in FIGS. 16 and 17. This feature is provided so that the window shades can be operated even under conditions when electrical power is lost. Motor 69 has a hex-shaped drive shaft 113. Drive shaft 113 mounted in the housing comprised of lower housing 114a and upper housing 114b. Drive shaft 113 turns output shaft 115 via manual override assembly 111. Output shaft 115 has its pulley driving end drivingly coupled to pulley 65. The other end of output shaft 115 is also hex-shaped. Coupler 123 is slidably mounted on the hex-shaped ends of shafts 113 and 115 which adjoin each other. Spring 125 is under compression between shoulder 127 on the coupler and shoulder 129 on the bottom housing. Thus, spring 125 biases coupler 123 into its coupling position. In this position of coupler 123, rotation of motor drive shaft 113 will be transmitted to pulley 65 via shaft 115.

Figure 18:
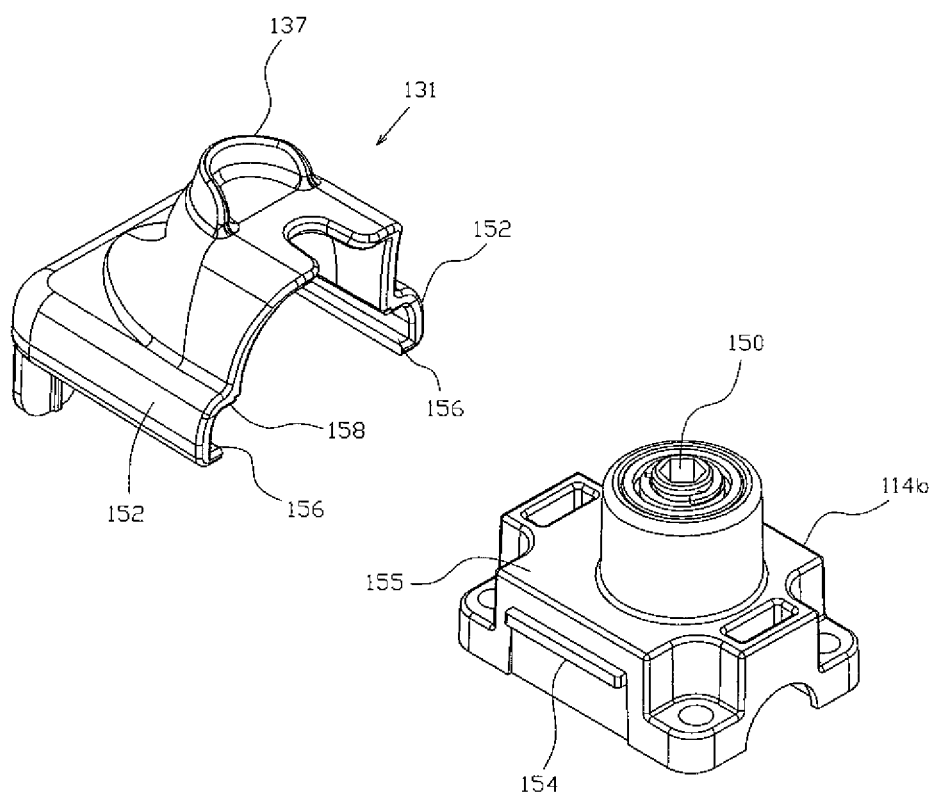
FIG. 18 is an exploded perspective view of a portion of FIG. 17.

The manual override assembly 111 includes a vertical shaft 117 with a bevel gear 119 at its end which is in mesh with bevel gear 121 on output shaft 115. The top of shaft 117 has an opening 150 (see FIG. 18) that is shaped to receive a tool (not shown) that can be inserted and then used to manually turn shaft 117. As shaft 117 and, along with it, bevel gear 119 are turned, bevel gear 121 can turn shaft 115. However, as long as shafts 113 and 115 are coupled to each other, manual rotation of shaft 115 is prevented by motor 69. To avoid this hindrance, a slidable cover 131 is provided. The flared sides 152 of cover 131 slide on rails 154 and the upper surface 155 of upper housing 114b. As can be appreciated from FIG. 18, the straight bottom edge 156 of flared side 152 engages under rail 154, while the top 158 rides on surface 155.

Cover 131 has a bottom skirt 133 that has a half-opening 135 through which shaft 115 passes. The wall of skirt 133 that defines opening 135 bears against coupler 123. As shown in FIGS. 16 and 17, cover 131 is in its static, rest position as spring 125 presses coupler to the right, and coupler 125 likewise presses the skirt to the right. Cover 131 has an upwardly extending wall 137 that can serve as a finger catch. Cover 131 can be moved manually to the left by hooking a finger against wall 137 and pushing against the force exerted by spring 125. This uncovers opening 150 in shaft 117 so that the turning tool can be inserted into it. With the tool in the opening, the cover 131 is prevented from returning to its rest position under the influence of spring 125. Thus, cover 131 stays in its displaced position until the turning tool is removed.

As cover 131 is moved to its displaced position, skirt 133 forces coupler 123 to slide off output shaft 115, thereby de-coupling shafts 113 and 115 from each other. This frees output shaft 115 to turn under turning forces applied by shaft 117 and gears 119, 121 without interference from motor 69.

In order to prevent uncommanded motion of the shades, motors 69 and 69a are each provided with an electromagnetic brake 165 that is activated by the electronic control when the shade reaches its desired position. The motors are also provided with gearhead 170. Motors 69 and 69a are available from Faulhaber as Part No. 2232V0085. The electromagnetic brake 165 is available from Inertia Dynamics LLC as Part No. M1701-0005. The gearhead is available from Faulhaber as Part No. 104250.

Although the motorized drive mechanism 15 is disclosed as being motor actuated, the rest of mechanism 15 without the motors can also be highly useful. Motors 69 and 69a can be replaced by a manual drive arrangement. It could be similar to the manual override assembly 111 as disclosed herein that would function as a permanent drive rather than as an override. However, other manually driven arrangements could also be applied to turn pulley 65 and move cable 63 so as to create linear motion for extending and compressing the shades.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A motorized mechanism for operating a window shade for controlling the amount of light admitted through a window, comprising:

a window shade adapted to be extended and compressed relative to the window in accordance with motion within a housing of a rail assembly attached to one end of said window shade, wherein said rail assembly includes an axle extending between opposite ends of said rail assembly;

a motor secured to the housing and coupled to a motor-driven first pulley;

a cable looped between said motor-driven first pulley and a second pulley, said second pulley being secured to the housing remotely from said first pulley; and first and second components respectively coupled to said axle at opposite ends of said rail assembly, with only one of said first and second components comprising a driven component that is coupled to said cable to be movable within the housing between the first and second pulleys with motion of the cable in response to motor driven rotation of said first pulley to extend or compress the window shade, with the other one of said first and second components comprising a passive component that is movable within the housing in response to the movement of the driven component, wherein said first component comprises a carrier having a gear rotatably coupled thereto, and wherein said cable is secured to said carrier.

2. The motorized mechanism of claim 1, wherein:
said second component includes a gear, and the gears of said respective first and second components are attached to opposite ends of said axle to engage with respective racks affixed in the housing so that both said gears move along the housing in response to motor driven rotation of said first pulley.

3. The motorized mechanism of claim 1, wherein said second pulley is secured to the housing by a cable tensioning assembly.

4. A motorized mechanism for actuating motion within a housing of a window shade arrangement for controlling the amount of light admitted through a window, comprising:
a first window shade and a second window shade, said first window shade having a first end secured to the housing and a second end secured to a first rail assembly movable in the housing, said second window shade having a first end secured to said first rail assembly and a second end secured to a second rail assembly movable in the housing, said first and second window shades being adapted to be extended and compressed relative to the window in accordance with motion within the housing of at least one of said first and second rail assemblies;
a first motor secured to the housing and coupled to a motor-driven first pulley;
a first cable looped between said first pulley and a second pulley, said second pulley being secured to the housing remotely from said first pulley;
a second motor secured to the housing and coupled to a motor-driven third pulley;
a second cable looped between said motor-driven third pulley and a fourth pulley, said fourth pulley being secured to the housing remotely from said third pulley;
a first component coupled to one end of said first rail assembly and a second component coupled to the other end of said first rail assembly;
a third component coupled to one end of said second rail assembly and a fourth component coupled to the other end of said second rail assembly;
wherein said first cable is coupled to said third component to be movable within the housing between said first and second pulleys with motion of said first cable in response to motor driven rotation of said first pulley to extend or compress the second window shade, and
wherein said second cable is coupled to said second component to be movable within the housing between said third and fourth pulleys with motion of said second cable in response to motor driven rotation of said third pulley to extend or compress the first window shade,
wherein said first cable runs freely through said first component, and
wherein said second cable runs freely through said fourth component.

5. The motorized mechanism of claim 4, wherein said second pulley is secured to the housing by a first cable tensioning assembly, and wherein said fourth pulley is secured to the housing by a second cable tensioning assembly.

6. The motorized mechanism of claim 4, further comprising:
a first output shaft having one end driving said first pulley and a second end coupled by a first coupler, when in a coupling position, to a drive shaft of the first motor, wherein the first coupler is movably mounted and is spring-biased to be in the coupling position, a first manually actuatable release mechanism configured for movement against the spring bias to a decoupling position of the first coupler to decouple the drive shaft of the first motor from the first output shaft, and a first manually actuatable turning mechanism to turn the first output shaft when the first coupler is in the decoupling position; and
a second output shaft having one end driving said third pulley and a second end coupled by a second coupler, when in a coupling position, to a drive shaft of the second motor, wherein the second coupler is movably mounted and is spring-biased to be in the coupling position, a second manually actuatable release mechanism configured for movement against the spring bias to a decoupling position of the second coupler to decouple the drive shaft of the second motor from the second output shaft, and a second manually actuatable turning mechanism to turn the second output shaft when the second coupler is in the decoupling position.

7. The motorized mechanism of claim 4, wherein said third component comprises a third carrier having the gear of said third component rotatably coupled thereto, wherein said first cable is secured to said third carrier, wherein said second component comprises a second carrier having the gear of the third component rotatably coupled thereto, and wherein said second cable is secured to said second carrier.

8. The motorized mechanism of claim 7, wherein said first component comprises a first carrier having the gear of said first component rotatably coupled thereto, wherein said first cable non-drivingly engages said first carrier, wherein said fourth component comprises a fourth carrier having the gear of said fourth component rotatably coupled thereto, and wherein said second cable non-drivingly engages said fourth carrier.

9. The motorized mechanism of claim 4, wherein said first cable travels in a first path between said first and second pulleys, and wherein said second cable travels in a second path between said third and fourth pulleys, said first and third components being in said first path, and said second and fourth components being in said second path.

10. The motorized mechanism of claim 9, wherein said first cable non-drivingly engages said first component, and wherein said second cable non-drivingly engages the fourth component.

11. The motorized mechanism of claim 9, wherein:
said first rail assembly includes a first axle extending from one end of said first rail assembly to the other,
each of said first and second components includes a gear, and the gears of said respective first and second components are attached to opposite ends of said first axle to engage with respective racks affixed in the housing to be driven along the housing in response to motor driven rotation of said first pulley,
said second rail assembly includes a second axle extending from one end of said second rail assembly to the other, and
each of said third and fourth components includes a gear, and the gears of said respective third and fourth components are attached to opposite ends of said second axle to engage with respective racks affixed in the housing to be driven along the housing in response to motor driven rotation of said third pulley.

12. A motorized mechanism for actuating motion within a housing of a window shade arrangement having first and second window shades for controlling the amount of light admitted through a window, comprising:
a first rail assembly movable in the housing and connected to a first end of the first window shade and a first end of the second window shade, a second rail assembly movable in the housing and connected to a second end of the second window shade, a second end of the first window shade being fixed to the housing, said first and second window shades being adapted to be extended and compressed relative to the window in accordance with motion within the housing of at least one of said first and second rail assemblies;

first and second components coupled to respective ends of said first rail assembly;

third and fourth components coupled to respective ends of said second rail assembly;

a first cable looped between a motor-driven first pulley and a second pulley;

a second cable looped between a motor-driven third pulley and a fourth pulley;

only one of said first and second components being connected to the first cable, the first cable running freely through the other one of said first and second components; and only one of said third and fourth components being connected to the second cable, the second cable running freely through the other one of said third and fourth components.

13. The motorized mechanism of claim 12, wherein said second pulley is secured to the housing by a first cable tensioning assembly, and wherein said fourth pulley is secured to the housing by a second cable tensioning assembly.

14. The motorized mechanism of claim 12, wherein:

said first rail assembly includes a first axle extending from one end of said first rail assembly to the other, and gears are attached to opposite ends of said first axle to engage with respective racks affixed in the housing to be driven along the housing in response to motor driven rotation of said first pulley, and said second rail assembly includes a second axle extending from one end of said second rail assembly to the other, and gears are attached to opposite ends of said second axle to engage with respective racks affixed in the housing to be driven along the housing in response to motor driven rotation of said third pulley.

* * * * *